March 26, 1929.  E. MERZINGER  1,707,169
SECURING MEANS FOR MALE PARTS OF PRESS BUTTONS
Filed Dec. 31, 1926
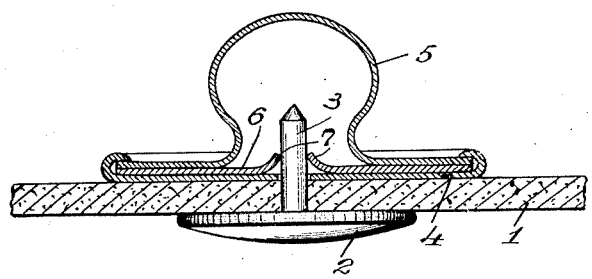
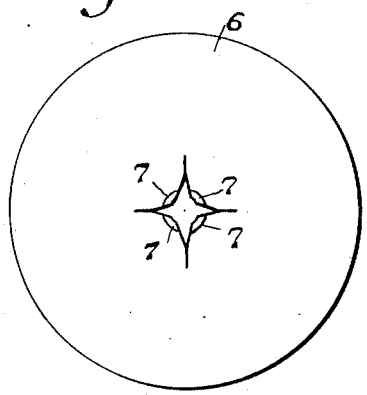
Inventor:
Eduard Merzinger
By
Attorney.

Patented Mar. 26, 1929.

1,707,169

UNITED STATES PATENT OFFICE.

EDUARD MERZINGER, OF VRSOVIC, NEAR PRAGUE, CZECHOSLOVAKIA.

SECURING MEANS FOR MALE PARTS OF PRESS BUTTONS.

Application filed December 31, 1926, Serial No. 158,357, and in Czechoslovakia May 6, 1926.

Male parts of press-buttons were hitherto generally secured to a material by sewing on, or by means of a hollow rivet flanged over on the back of the material, or by means of a pin rolled up in the head of the male part.

The object of the invention is to simplify this method of securing the button, by utilizing the methods which are used at present for securing bachelors' buttons, i. e. without sewing-on threads, to the material.

According to the invention there is provided in the male part of the press-button, a resilient part which grips fast a pin introduced from the back of the material. This resilient part is constituted by a disc or washer with a central opening, the edge of which allows the introduction of the fastening pin into the male part of the press-button, but does not allow the pin to be withdrawn from the male part, as the edge of the said opening exercises on the pin a clamping action acting in opposition to withdrawal tension. Owing to the male part of the press-button being provided with the resilient part, which is otherwise used only for the so-called bachelors' buttons, the securing of the male part of the press-button to the material is considerably simplified, moreover the advantage is obtained also that the male part of the press-button, and therefore the whole press-button fastening, may be made considerably shorter, as the relatively large space for the hollow rivet or for the rolled-up pin is no longer required.

A construction according to the invention is shown, by way of example, in the accompanying drawing in which Figure 1 is a sectional view, and Fig. 2 is a plan view of the washer.

The material 1 is gripped fast between the head 2 of the holding pin 3 and the base 4 of the male pin 5 of the press-button. The male part of the press-button has a washer 6, with a resilient inner edge, through the central opening of which passes the pin 3, the resilient tongues or fingers on the edge of the opening preventing the pin from being pulled out.

Obviously, instead of providing a washer 6 for holding the pin, the pin may pass directly through the base 4, in which case, the edge of the central opening of the base is made in such a manner that the pin 3 is gripped thereby.

What I claim is:

A press-button for fabrics and the like comprising a base member adapted to bear against the fabric; a male member secured to the base member; a washer secured between said base member and the male member and having a central opening therein provided with a resilient inner edge, said edge comprising resilient fingers; and a holding pin having a head adapted to press against and through the fabric, the holding pin projecting into and through the opening in the base member and the washer in which it is securely gripped against removal due to the fingers on the resilient edge tightly contacting the holding pin.

In testimony whereof I affix my signature.

EDUARD MERZINGER.